May 21, 1935.  W. J. ALBERSHEIM  2,002,214
MODULATING SYSTEM
Filed June 21, 1933  2 Sheets-Sheet 1
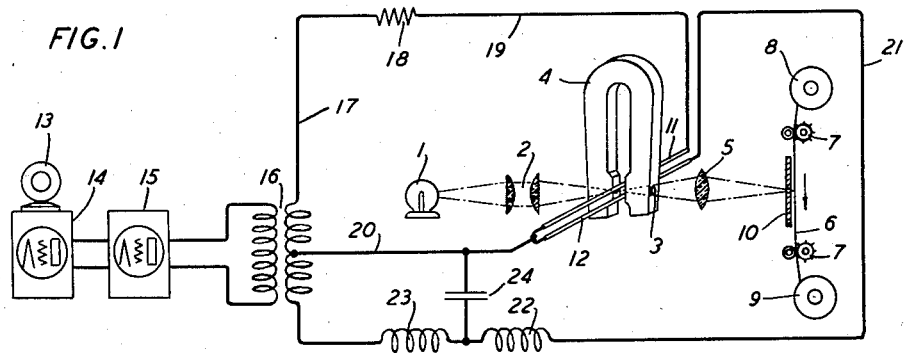
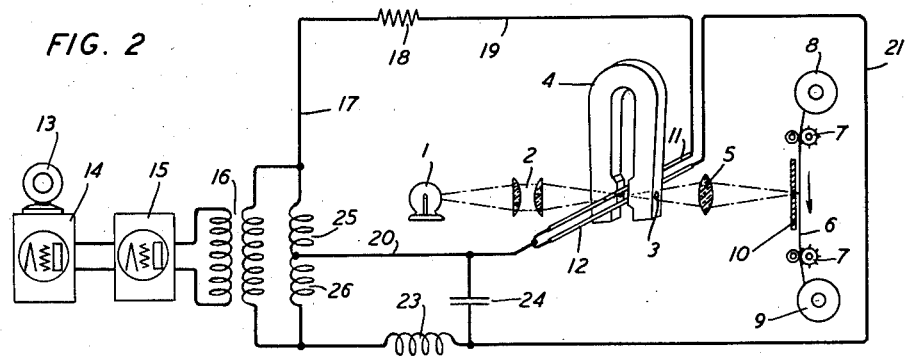
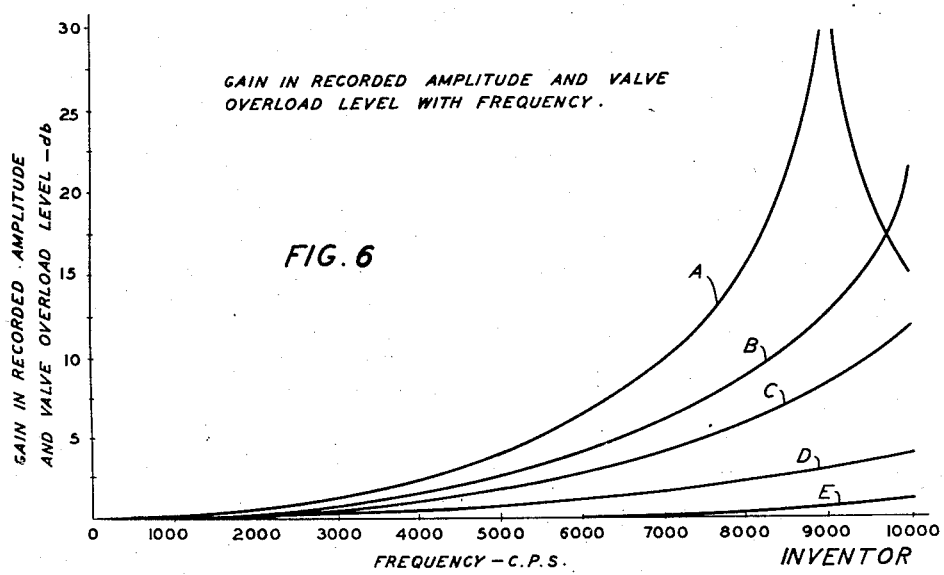
INVENTOR
W. J. ALBERSHEIM
BY
G. H. Heydt
ATTORNEY May 21, 1935.  W. J. ALBERSHEIM  2,002,214
MODULATING SYSTEM
Filed June 21, 1933  2 Sheets-Sheet 2
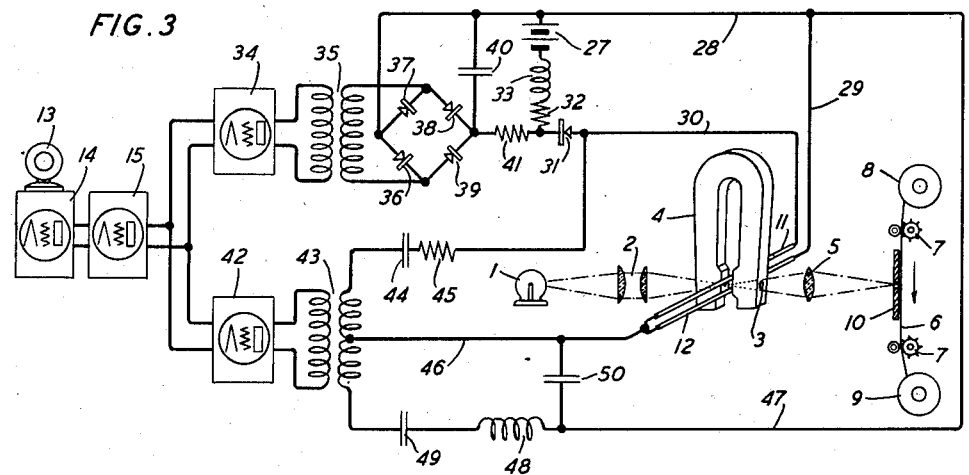
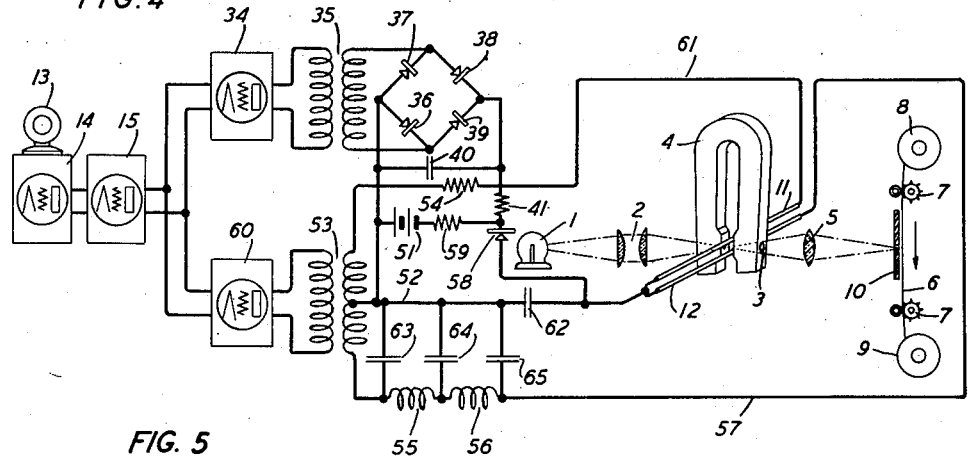
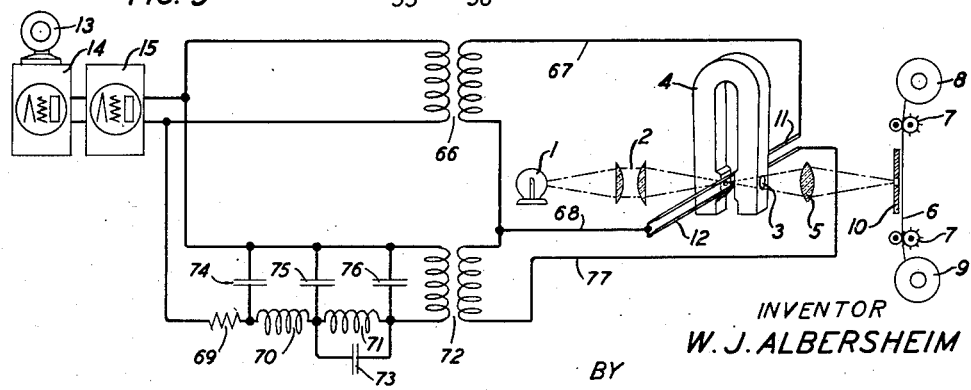
INVENTOR
W. J. ALBERSHEIM
BY
G. H. Heydt
ATTORNEY Patented May 21, 1935

2,002,214

UNITED STATES PATENT OFFICE 2,002,214

MODULATING SYSTEM

Walter J. Albersheim, New York, N. Y., assignor to Electrical Research Products, Inc., New York, N. Y., a corporation of Delaware Application June 21, 1933, Serial No. 676,889
In Great Britain October 19, 1932

17 Claims. (Cl. 179—100.3)

This invention relates to systems for modulating a beam of radiant energy and particularly to systems in which the modulating device comprises elements having a component of motion in the direction of motion of a surface.

The object of the invention is to independently actuate the elements so that the resultant impressions on the surface will reinforce each other.

A feature of the invention is the supply of power independently to each element.

Another feature of the invention is the interposition of a delay element in the power supply to one of the elements.

A further feature of the invention is the use of a delay element of such character that a constant delay is interposed in the power supply to one of the elements.

The invention is applicable to any modulating system in which a beam of radiant energy of any character excites a suitable receiving surface and is modulated by a plurality of elements having a component of motion in the direction of motion of the surface. The beam may comprise any form of energy which can be radiated through space, such as visible light, infra-red rays, ultra-violet rays, electron discharges, ionic discharges, corona discharges, etc. The receiving surface may be any surface having relative motion with respect to the beam and capable of being excited by the radiation employed. The modulating elements may be any elements capable of defining and modulating the height of the beam and having a component of motion in the direction of motion of the surface. The elements may be oscillated by any form of power electrical, mechanical, thermal, etc.

For convenience of description, the type of light valve described in an article "The principles of the light valve" by T. E. Shea, W. Herriott and W. R. Goehner, published in the Journal of the Society of Motion Picture Engineers, Vol. XVIII, pages 697 to 730, June 1932 has been disclosed, but it will be apparent to those skilled in the art, that the invention is not limited to this specific type of modulator, but is applicable to many other types, such as the light valves disclosed in U. S. Patents 1,753,530, April 8, 1930 to F. H. Owens and 1,836,558, December 15, 1931 to R. J. Sherman. The invention is applicable to many electro-optical systems, such as television, telephotographic, and sound recording systems and is also applicable to the registration of mechanical or thermal phenomena.

In many modulating systems, a beam of radiant energy is directed to a surface moving at a predetermined speed. The height of the beam of radiant energy is defined by the elements of a modulator which may be disposed at a desired angle to the direction of motion of the surface. When power is applied to the elements of the modulator, the elements are simultaneously moved with positive and negative components of motion in the direction of motion of the surface. As the beam of radiant energy has a finite height, the modulation in the beam produced by one element will not coincide in position on the surface with the modulation produced by another element. If the period of the variation in the power is large compared to the time required for an element of the surface to pass through the beam, this effect is not of great importance. If, however, the period of the variation in the power is not large compared to the time required for an element of the surface to pass through the beam, the modulations by the elements may separately produce impressions on the surface and the resultant impressions produced will be distorted and of less amplitude than the variation in the power. For convenience of discussion, the variation in the power may be assumed to be sinusoidal, though the invention is applicable to any type of variation. The moving surface may be a photographic film in which a light beam produces a latent image, but other surfaces such as a photoelectric cell, selenium cell or any other sensitive surface may be employed.

In accordance with the present invention, the power supplied to one element of the modulator is delayed with respect to the power supplied to another element of the modulator. The elements of the modulator are no longer actuated simultaneously, but have a predetermined phase difference. The time delay may preferably be of the order of the time required for an element of the surface to pass through the unmodulated beam. In this case, the impressions produced by the successive movements of the elements of the modulator will substantially reinforce each other on the moving surface. Or, the time delay may be some function of the frequency which is related to the variation in the power supplied.

When the impressions due to the successive movements of the elements of the modulator reinforce each other, the resultant impression is of greater amplitude than the impression heretofore produced by the elements. This will result in a gain in amplitude of the reproduced sound, which for a given light valve may be of the order of 4 or 5 decibels at 5000 cycles per second rising to 10 or 15 decibels at 8000 cycles per second.

In addition to the greatly enhanced output at high frequencies, a further advantage is obtained by the present invention. In known modulators, the maximum power which may be handled without distortion is that power which causes the elements of the modulator to touch when at the inner limit of their oscillations. As the elements of the modulator move simultaneously, the point of contact will be in the center of the beam.

In the present invention, the elements of the modulator no longer move simultaneously, thus the maximum excursions during oscillation do not occur at the same instant. The elements may thus be permitted to pass beyond the center of the beam without clashing. The resultant gain in the overload level of the modulator will be of about the same order as the gain in amplitude given above. This advantage may be of such value that the delay introduced into the circuit may be designed to exceed the time required for an element of the surface to pass through the beam.

In the drawings:

Fig. 1 diagrammatically shows the invention embodied in a simple film sound recording system;

Fig. 2 is a modification of Fig. 1;

Fig. 3 diagrammatically shows the invention embodied in a noise reduction film sound recording system;

Fig. 4 diagrammatically shows the invention embodied in a composite noise reduction film sound recording system;

Fig. 5 is a modification of Fig. 1; and

Fig. 6 is a diagram showing the gain due to the use of the invention with light valves of various spacings.

Radiant energy from a suitable source, such as a lamp 1, is directed by an optical system, such as the lens system 2, on the aligned orifices 3 pierced in the pole faces of the permanent magnet 4. The radiant energy emerging from the orifice 3 is directed by an optical system, such as the lens 5, to a sensitive surface, such as the film 6. The film 6 may be traversed in the known manner by sprockets 7, 7, from reel 8 to reel 9. An opaque plate 10 pierced by a small aperture limits the area of the sensitive film exposed to the radiant energy. While the sensitive surface has been disclosed as moving with respect to the beam of radiant energy, it will be obvious that in certain uses, such as television, that the beam may be moved with respect to the surface. The height of the beam longitudinally of the surface is defined by the inner edges of the elements 11, 12, which may be two flat conducting ribbons or the two parts of one ribbon. When an electric current flows in the ribbons 11, 12, the reaction of the magnetic field due to the current flowing in the ribbons 11, 12 with the magnetic field due to the magnet 4 will tend to displace the ribbons 11, 12 and vary the height of the beam of radiant energy impressed on the film 6. Similarly numbered elements in Figs. 1, 2, 3, 4 and 5 have similar functions.

The signal currents may be supplied by a microphone 13 actuated by acoustic waves, and suitably amplified in the amplifiers 14 and 15. Any other source of signal power, such as a telephone or telegraph current, current from a sound reproducer, image current from a television or picture transmission equipment, or other power may be employed.

Referring now to Fig. 1, the signal currents are supplied to the primary winding of transformer 16 and induce an electromotive force in the two halves of the secondary winding. Current will flow from the upper half of the secondary winding through wire 17, resistor 18, wire 19, ribbon 11, common wire 20 back to the winding. As this circuit is largely composed of non-inductive resistances, the current will commence to flow very soon after the voltage is induced in the secondary winding of the transformer. The ribbon 11 will be displaced and will produce a latent image of its movement on the moving film 6. Current will tend to flow from the lower half of the secondary winding through wire 20, ribbon 12, wire 21, inductors 22 and 23 back to the winding. The inductors 22 and 23, together with the capacitor 24 form a full section delay network, which may be designed in accordance with U. S. Patent 1,576,459, issued March 9, 1926 to G. W. Pierce. The current will not commence to flow in this half of the circuit for a time determined by the constants of the delay network. If the delay time is suitably chosen, when the ribbon 12 is displaced the latent image of its movement on the film 6 will reinforce the latent image produced by the ribbon 11. Taking, for example, the case of a film moving at the rate of eighteen inches per second, and a light valve producing an image at the film having a normal or unmodulated height of five ten-thousandths of an inch the inductors 22 and 23 may have a self-inductance of about thirty microhenries and a coefficient of coupling about one-third, while the capacitor 24 may have a capacitance of about ten microfarads.

The operation of Fig. 2 is similar to the operation of Fig. 1. In Fig. 2, the secondary winding of transformer 16 need not be tapped, the two equal inductors 25 and 26 serving to determine the electrical mid-point of the secondary winding. The delay network formed by the inductor 23 and capacitor 24 is somewhat simpler and cheaper than the network shown in Fig. 1, but differs from the network shown in that the phase shift is not as nearly linear with frequency, that is, the delay time varies slightly as a function of the frequency. This network has, however, certain advantages for some particular purposes. For the same conditions as assumed for Fig. 1, the inductor 23 may be about forty-five microhenries and the capacitor 24 about seven microfarads.

In Fig. 3, current from a battery 27 flows through wires 28 and 29, through ribbons 12 and 11, wire 30, rectifier 31, resistor 32, inductor 33 back to battery 27. In the absence of signal current, this static biasing current draws the ribbons 11 and 12 closer together, thus reducing the time of exposure of the film 6. A portion of the signal currents from the amplifier 15, further amplified if desired in the amplifier 34, are applied through the transformer 35 to the full-wave bridge-connected rectifier formed of the rectifier elements 36, 37, 38, 39. The output of this rectifier charges the capacitor 40 which discharges through resistor 41, resistor 32, inductor 33 and battery 27. The increased potential loss in resistor 32 and inductor 33 decreases the static biasing current flowing in the ribbons 11 and 12 and permits the ribbons to separate, increasing the mean time of exposure of the film 6 and the load carrying capacity of the light valve in proportion to the signal currents. The rectifier 31 prevents reversal of the static biasing current. This portion of the circuit forms the control circuit of the well known noise reduction circuit.

A portion of the signal currents from the amplifier 15, further amplified if desired in the amplifier 42, are applied to the primary winding 70 of the transformer 43 and induce an electromotive force in the secondary winding. Current will flow from the upper half of the secondary winding through capacitor 44, resistor 45, wire 30, ribbon 11, and wire 46 to the winding. Capacitor 44 is very large and should have a capacitance of 1000 to 2000 microfarads. The circuit is thus largely composed of non-inductive resistance and the current will commerce to flow very soon after the voltage is induced. The ribbon 11 will be displaced and will produce a latent image of its movement on the moving film 6. Current will also tend to flow from the lower half of the secondary winding of transformer 43 through wire 46, ribbon 12, wire 29, wire 47, inductor 48, capacitor 49 to the winding. Capacitor 49 has a capacity similar to capacitor 44. The inductor 48 and capacitor 50 form a delay network of the type disclosed in Fig. 2, thus the displacement of ribbon 12 is delayed until the latent image formed by the movement of the ribbon 12 will reinforce the latent image formed by the movement of the ribbon 11.

In Fig. 4, current from a battery 51 flows through wire 52 to the mid-point of the secondary winding of transformer 53 and there divides, one part flowing through resistor 54, wire 61 and ribbon 11, and the other part through inductors 55 and 56, wire 57 and ribbon 12. The total current then flows through rectifier 58 and resistor 59 to battery 51. This current forms a static biasing current which may be adjusted by the resistor 59. The resistance of the resistor 54 balances the resistance of the inductors 55 and 56 so that the currents flowing in the two halves of the secondary winding of transformer 53 are equal and do not magnetize the winding. Thus the large capacitors 44 and 49 of Fig. 3 are not required. The static biasing current reduces the time of exposure of the film 6 as usual in noise reduction circuits. The amplifier 34, transformer 35, rectifier network 36, 37, 38, 39, capacitor 40 and resistor 41 operate in the same manner as the similarly membered elements in Fig. 4 to reduce the static biasing current when signal currents are applied to the control circuit. A part of the signal currents from amplifier 15, suitably amplified if desired in amplifier 60, are applied to the primary winding of transformer 53 and induce an electromotive force in the secondary winding. Current flows from the upper half of the secondary winding through resistor 54, wire 61, ribbon 11, capacitor 62 and wire 52, displacing the ribbon 11, and causing the formation of a latent image of the movement of the ribbon 11 on the film 6. The capacitor 62 should have a large capacitance of the order of 1000 to 2000 microfarads. As this circuit is thus composed largely of non-inductive resistance, the current will commence to flow very soon after the voltage is induced. Current will also tend to flow from the lower half of the secondary winding of transformer 53, through wire 52, capacitor 62, ribbon 12, wire 57, inductors 56 and 55 to the winding. The inductors 55 and 56, and capacitors 63, 64 and 65 form a two section delay network, thus the displacement of ribbon 12 is delayed until the latent image formed by the movement of the ribbon 12 will reinforce the latent image formed by the movement of the ribbon 11. Taking, for example, the case of a film moving at the rate of eighteen inches per second and a light valve producing an image at the film having a normal or unmodulated height of one one-thousandth of an inch, the inductors 55 and 56 may have a self-inductance of about sixty microhenries and a coefficient of coupling of one-fifth, the capacitors 63 and 65 may have a capacitance of about five microfarads, and the capacitor 64 a capacitance of about thirteen microfarads.

The type of network to be employed under any given conditions will be determined largely by the time taken by an element of the surface to pass through the recording beam, that is, by the velocity of the surface and the height of the image of the beam on the surface.

A delay network is thus not peculiarly related to a particular recording circuit, and the network of any of the figures may be employed with any of the recording circuits shown in the other figures.

Referring now to Fig. 5, signal currents are supplied to the primary winding of transformer 66 and induce an electromotive force in the secondary winding. Very soon after the voltage is induced, current commences to flow through wire 67, ribbon 11, wire 68 to the secondary winding. Signal currents are also supplied through resistor 69 and inductors 70 and 71 to the primary winding of transformer 72. The inductors 70 and 71, with the capacitors 73, 74, 75 and 76 form a delay network. Thus the current supplied to the primary winding of transformer 72 is delayed with respect to the current supplied to the primary winding of transformer 66. The current flowing in the primary winding of transformer 72 will cause a current to flow through wire 68, ribbon 12, wire 77 back to the secondary winding. Ribbon 12 will thus move after ribbon 11. The advantage of this embodiment is that the delay network is located in a circuit of comparatively high impedance compared to the usual recording device. Also any variations in the impedance of the recording device due to its movement have less effect on the action of the delay network. The design of the delay network is thus considerably simplified.

Fig. 6 illustrates the gain in recorded amplitude and in the light valve overload level at various frequencies which may be attained by the application of this invention to a sound recording system in which the film has a velocity of eighteen inches per second. Curve A illustrates the gain attained when the normal or unmodulated height of the image formed on the film is one one-thousandth of an inch. In curve B, the normal height is eight and one-half ten-thousandths of an inch, in curve C, seven and one-half ten-thousandths of an inch, in curve D, five ten-thousandths of an inch, and in curve E, two and one-half ten-thousandths of an inch.

While the invention has been disclosed applied to a system in which electrical power is applied to the recording elements, it will be obvious to those skilled in the art that the invention is equally applicable to a system in which mechanical power is applied to the recording elements and in which the delay network is formed of a mechanical low-pass filter.

What is claimed is:

1. In a modulating system, means for projecting a beam of light to a receiving surface, means for producing relative movement between said beam and said surface, means for modulating said beam including a plurality of elements executing reversely symmetrical oscillations having a component of motion in the direction of said relative movement, a source of power for actuating all said elements, and means in the supply circuit of one of said elements to cause said element to oscillate out of phase with another of said elements.

2. In a modulating system, means for projecting a beam of radiant energy to a receiving surface, means for producing relative movement between said beam and said surface, means for modulating said beam including a plurality of elements executing reversely symmetrical oscillations having a component of motion in the direction of said relative movement, a source of power for actuating all said elements, and means for causing one of said elements to oscillate out of phase with another of said elements.

3. In a modulating system, means for projecting a beam of radiant energy to a receiving surface, means for producing relative movement between said beam and said surface, means for modulating said beam including a pair of elements executing reversely symmetrical oscillations having a component of motion in the direction of said relative movement, a source of power for actuating both said elements, and means in the power supply of one of said elements to cause said element to oscillate out of phase with the other element.

4. The system in claim 3 in which the pair of elements are parallel to each other.

5. In a modulating system, means for projecting a beam of radiant energy, a receiving surface moved through said beam, means for modulating said beam including a plurality of elements executing reversely symmetrical oscillations having a component of motion in the direction of movement of said surface, a source of power for actuating all said elements, and means in the power supply of one of said elements to cause the element to oscillate out of phase with another of said elements.

6. In a modulating system, means for projecting a beam of radiant energy to a receiving surface, means for producing relative movement between said beam and said surface, means for modulating said beam including a plurality of elements executing reversely symmetrical oscillations having a component of motion in the direction of said relative movement, a source of power for actuating all said elements, and means in the power supply of one of said elements to delay the power delivered to said element relative to the power delivered to another of said elements.

7. In a modulating system, means for projecting a beam of radiant energy, a receiving surface moved through said beam, means for modulating said beam including a plurality of elements executing reversely symmetrical oscillations having a component of motion in the direction of movement of said surface, a source of power for actuating all said elements, and means in the power supply of one of said elements to delay the power delivered to said element relative to the power delivered to another of said elements.

8. In a modulating system, means for projecting a beam of radiant energy to a receiving surface, means for producing relative movement between said beam and said surface, means for modulating said beam including a pair of elements executing reversely symmetrical oscillations having a component of motion in the direction of said relative movement, a source of power for actuating both said elements, and means in the power supply of one of said elements to delay the power delivered to said element relative to the power delivered to the other element.

9. In a modulating system, means for projecting a beam of radiant energy to a receiving surface, means for producing relative movement between said beam and said surface, means for modulating said beam including a plurality of elements executing reversely symmetrical oscillations having a component of motion in the direction of said relative movement, a source of power for actuating all said elements, and means to delay the power delivered to one of said elements relative to the power delivered to another of said elements for a time substantially equal to the time taken by an element of the surface to pass through the beam.

10. In a modulating system, means for projecting a beam of radiant energy, a receiving surface moved through said beam, means for modulating said beam including a pair of elements executing reversely symmetrical oscillations having a component of motion in the direction of movement of said surface, a source of power for both said elements, and means to delay the power delivered to one of said elements relative to the power delivered to the other element for a time substantially equal to the time taken by an element of the surface to pass through the beam.

11. The system in claim 10 in which the elements are parallel to each other.

12. In a modulating system, means for projecting a beam of radiant energy to a receiving surface, means for producing relative movement between said beam and said surface, means for modulating said beam including a plurality of elements executing reversely symmetrical oscillations having a component of motion in the direction of said relative movement, a source of power for all said elements, and a delay network in the power supply to one of said elements.

13. The system in claim 12 in which the network has a phase shift varying linearly with the frequency of the power supplied to the element.

14. In an electro-optical system, a source of radiant energy, means for projecting a beam from said source, a sensitive surface moved at constant speed through said beam, a light valve interposed between said source and said surface and including a pair of elements executing reversely symmetrical oscillations having a component of motion in the direction of movement of said surface, a source of signal currents, and circuit connections for supplying currents from said source to actuate said elements including means to delay the currents supplied to one element for a time substantially equal to the time taken by an element of the surface to pass through the beam.

15. In an electro-optical system, a source of radiant energy, means for projecting a beam from said source, a sensitive surface moved at constant speed through said beam, a light valve interposed between said source and said surface and including a pair of elements executing reversely symmetrical oscillations having a component of motion in the direction of movement of said surface, a source of signal currents, and circuit connections for supplying currents from said source to said elements including a delay network in serial relation with one of said elements.

16. The combination in claim 15 in which the network has a phase shift varying linearly with the frequency of the signal currents.

17. The combination in claim 15 in which network delays the signal currents for a time substantially equal to the time taken by an element of the surface to pass through the beam.

WALTER J. ALBERSHEIM.